US006895996B2

(12) United States Patent
Gutmann et al.

(10) Patent No.: US 6,895,996 B2
(45) Date of Patent: *May 24, 2005

(54) FUEL PRESSURE REGULATOR HAVING OFFSET HEAD AND ORIFICE AXES

(75) Inventors: Thomas J. Gutmann, Rochester, NY (US); Ahmet T. Becene, Henrietta, NY (US); Charles W. Braun, Livonia, NY (US); Grover W. Preston, Livonia, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/952,295

(22) Filed: Sep. 28, 2004

(65) Prior Publication Data

US 2005/0034765 A1 Feb. 17, 2005

Related U.S. Application Data

(63) Continuation of application No. 10/606,906, filed on Jun. 26, 2003, now Pat. No. 6,802,340.

(51) Int. Cl.⁷ ............................................. F02M 41/00
(52) U.S. Cl. .......................... 137/510; 123/457; 251/86
(58) Field of Search .................. 123/497, 457, 123/511; 137/509, 510; 251/86

(56) References Cited

U.S. PATENT DOCUMENTS

| 4,060,193 A | * | 11/1977 | Foller ........................... 236/59 |
| 4,231,347 A | | 11/1980 | Ohumi et al. |
| 4,235,416 A | * | 11/1980 | LaCoste et al. ............... 251/86 |
| 4,742,845 A | | 5/1988 | Capoccia et al. |
| 5,220,941 A | | 6/1993 | Tuckey |
| 5,265,644 A | | 11/1993 | Tuckey |
| 5,709,369 A | * | 1/1998 | Hawkins et al. .............. 251/86 |
| 6,382,183 B1 | | 5/2002 | Preston et al. |
| 6,422,265 B1 | | 7/2002 | Beyer et al. |
| 6,481,418 B1 | | 11/2002 | Ristich et al. |
| 6,533,242 B2 | * | 3/2003 | Geib et al. ................... 251/214 |

* cited by examiner

Primary Examiner—Thomas Moulis
(74) Attorney, Agent, or Firm—Patrick M. Griffin

(57) ABSTRACT

A fuel pressure regulator including a valve head having a centerline offset from the centerline of a corresponding fuel orifice. The valve head may be offset with respect to the valve seat and orifice, the orifice may be offset within the seat with respect to the head and diaphragm assembly, or the axes of the head and seat may be non-coaxially biased. Because the vector of the valve closing force does not align with the centerline of the valve head and diaphragm assembly, a resulting torque on the valve head keeps the head in a stable, pivoted position at all flow rates. The valve head always makes contact with the valve seat at a predetermined point during regulator operation, eliminating pressure instabilities and noise experienced in prior art pressure regulators.

2 Claims, 7 Drawing Sheets

FUEL PRESSURE REGULATOR HAVING OFFSET HEAD AND ORIFICE AXES

CROSS REFERENCE TO RELATED APPLICATION

The present application is a continuation application of U.S. application Ser. No. 10/606,906 filed on Jun. 26, 2003 now U.S. Pat. No. 6,802,340.

TECHNICAL FIELD

The present invention relates to fuel supply systems for internal combustion engines; more particularly, to devices for controlling fuel supply pressure; and most particularly, to a fuel pressure regulator wherein a valve and diaphragm assembly is axially offset from a valve seat orifice to prevent large hysteresis values and audible noise.

BACKGROUND OF THE INVENTION

Fuel supply systems for internal combustion engines are well known and typically include means for maintaining a predetermined inline pressure of fuel being supplied to fuel injectors or carburetors or the like. A prior art fuel pressure regulator typically includes a valve having a matable seat and head. The valve seat includes a center-aligned fuel orifice. The fuel orifice is aligned with the centerline of the valve head, which causes the resulting opening and closing forces to be aligned on the same centerline, desirably providing a force balance to the regulator and intending to maintain a parallel orientation between the valve head and the seat. The valve head is generally pawn-shaped and includes a ball mounted on a stem and pivotably captured in a fixed retainer. Because the ball may swivel in the retainer, the valve head is undesirably responsive to flow cavitation turbulence occurring in the fuel orifice, resulting in valve vibration and audible noise (valve chatter). Because of this chaotic instability, the valve head sealing surface either can remain parallel to the valve seat sealing surface or can settle on the edge of the seat sealing surface at any one of an infinite number of angular positions. Because of minute pressure fluctuations on the sealing surface of the valve head, caused by cavitation, the valve head tends to flutter among ever-changing rest points on the seat. If the valve head does pivot and thereby remains in contact with the seat as flow rate is decreasing, the pressure at the set point flow rate will be significantly less than the actual increasing flow rate value (flow hysteresis). Audible noise and large hysteresis values can affect user satisfaction and also cause manufacturing problems and high reject rates.

What is needed is a fuel pressure regulator which is silent and lacks flow hysteresis.

It is a principal object of the present invention to provide an improved fuel pressure regulator wherein a valve head has a single and preferred mating position with a valve seat.

It is a further object of the invention to provide such a regulator which is simple and inexpensive to manufacture.

It is a still further object of the invention to reduce the manufacturing cost and waste for fuel pressure regulators.

SUMMARY OF THE INVENTION

Briefly described, a fuel pressure regulator in accordance with the invention includes a valve head and diaphragm assembly having a centerline offset from the centerline of a corresponding valve seat and fuel orifice. This may be accomplished either by offsetting the valve head and diaphragm assembly in the pressure regulator with respect to the seat and orifice, by offsetting the orifice in the seat with respect to the head and diaphragm assembly, or by inducing offsetting axes between the valve head and seat orifice.

The pressure differential between the control pressure above the valve and the backpressure on the fuel orifice results in a closing force that acts along the centerline of the fuel orifice. Since the vector of this force does not align with the centerline of the valve head and diaphragm assembly, a torque on the valve head is always present which acts on the valve swivel point to keep the valve in a stable, pivoted position at all flow rates. The valve head always makes contact with the valve seat along the sealing surface edge at the contact point having the shortest distance to the seat orifice centerline. Because the valve head maintains this single point contact during regulator operation, the pressure instability and noise problems are eliminated.

BRIEF DESCRIPTION OF THE DRAWINGS

The present invention will now be described, by way of example, with reference to the accompanying drawings, in which.

DESCRIPTION OF THE PREFERRED EMBODIMENTS

The benefits and advantages of a fuel pressure regulator in accordance with the invention may be better appreciated by first considering a prior art fuel pressure regulator.

Figure 2:
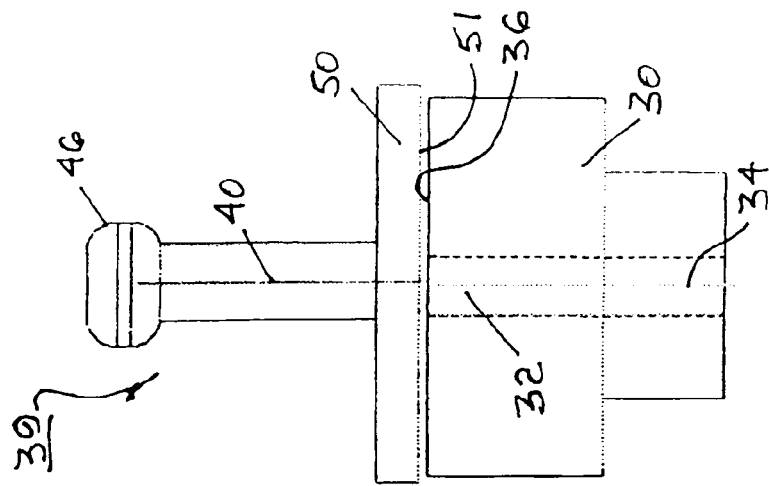
FIG. 2 is an elevational schematic view showing the relationship of the valve seat and valve head in a regulating valve assembly of the prior art regulator shown in FIG. 1.
Figure 1:
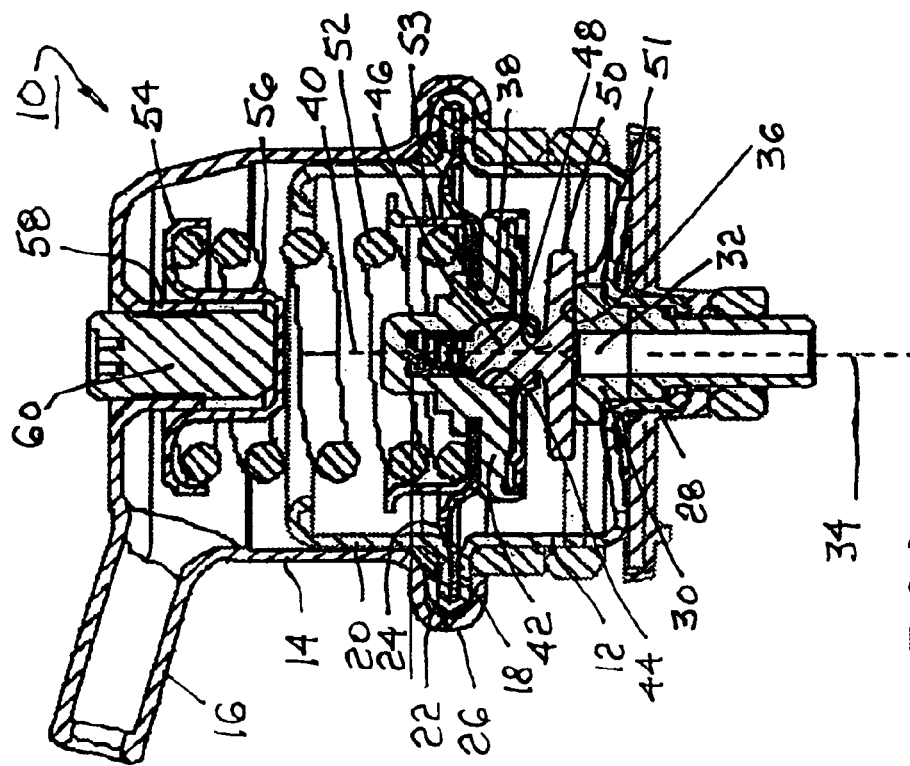
FIG. 1 is an elevational cross-sectional view of a prior art fuel pressure regulator.

Referring to FIGS. 1 and 2, a prior art fuel pressure regulator 10 comprises a lower shell 12 and an upper shell 14 having a manifold connection arm 16. Lower shell 12 includes a first flanged lip 18. A diaphragm retainer 20 is disposed within upper shell 14 and includes a second flanged lip 22. A flexible diaphragm 24 is disposed at its outer edge between first and second lips 18,22 and is captured therebetween via a rolled edge 26 of upper shell 14 which also serves to close and seal the assembly.

Axially disposed in a tubular process 28 of lower shell 12 is a valve seat 30 having a fuel orifice 32 centrally formed therein along seat axis 34 thereby having an orifice axis coincident therewith. Seat 30 has a first axial sealing surface 36 substantially orthogonal to axis 34.

Diaphragm 24 is provided with an aperture 38 having a diaphragm axis coaxial with seat axis 34. Disposed coaxially and sealingly within diaphragm aperture 38 is a valve retainer 42 having a typically conical socket 44 for retaining a ball end 46 of a valve head 48. Valve head 48, having axis 40 coaxial with the diaphragm axis, includes a flange 50 having a second axial sealing surface 51 for variably mating with first axial sealing surface 36 to regulate flow of fuel through orifice 32.

A pressure regulating spring 52 is compressibly disposed between a lower spring retainer 53 and an upper spring retainer 54 for urging second sealing surface 51 toward first sealing surface 36, lower retainer 53 being seated against diaphragm 24 to retain and seal the diaphragm against valve retainer 42. Upper spring retainer 54 is formed having a central well 56 for slidingly engaging a tubular process 58 formed in upper shell 14. An adjustment screw 60 in process 58 engages retainer 54 to adjust the axial position thereof and thus the compression of spring 50 and the pressure required for fuel to displace head 48 from seat 30.

As noted above, because head 48 and seat 30 are coaxially disposed in the prior art regulating valve assembly 39 (FIG. 2), and because head ball 46 is rotatably retained in retainer 42, head sealing surface 51 may engage seat sealing surface 36 at an infinite number of points along the periphery of seat sealing surface 36, none of which is preferred. Thus the motion of head 48 with respect to seat 30 can be chaotic during flow of fuel therebetween.

Figure 3:
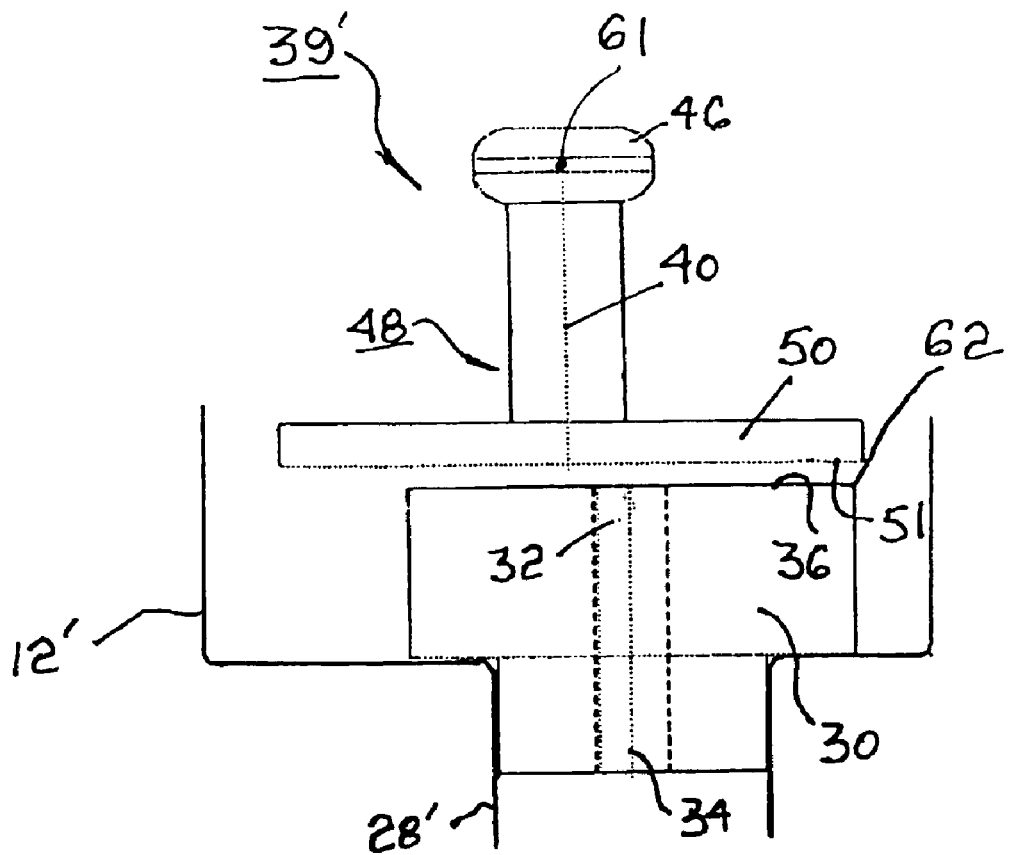
FIG. 3 is an elevational schematic view of a first embodiment of a regulating valve assembly in accordance with the invention.

Referring to FIG. 3, regulating valve assembly 39' includes a first embodiment in accordance with the invention. Head 48 and seat 30 are formed as in the prior art, as shown in FIGS. 1 and 2; however, the process 28' is formed off-center in lower shell 12' such that seat orifice axis 34 is not coaxial with head axis 40. When the axis of the valve head is offset from the axis of the seat orifice, the valve head has only one stable rest point on the seat. This is because the forces acting on the valve to close the valve are not on the same axis as the valve ball pivot point 61. The closing force is created by the local pressure drop at the seat orifice 32. The valve head always makes contact with the seat sealing surface 36 at the point 62 on the head sealing surface 51 closest to orifice 32. Since the vector of this force does not align with the valve's pivot axis, a torque always acts on the pivot point to keep the valve in contact with the seat. Thus, the motion of the head with respect to the seat is non-chaotic.

Figure 4:
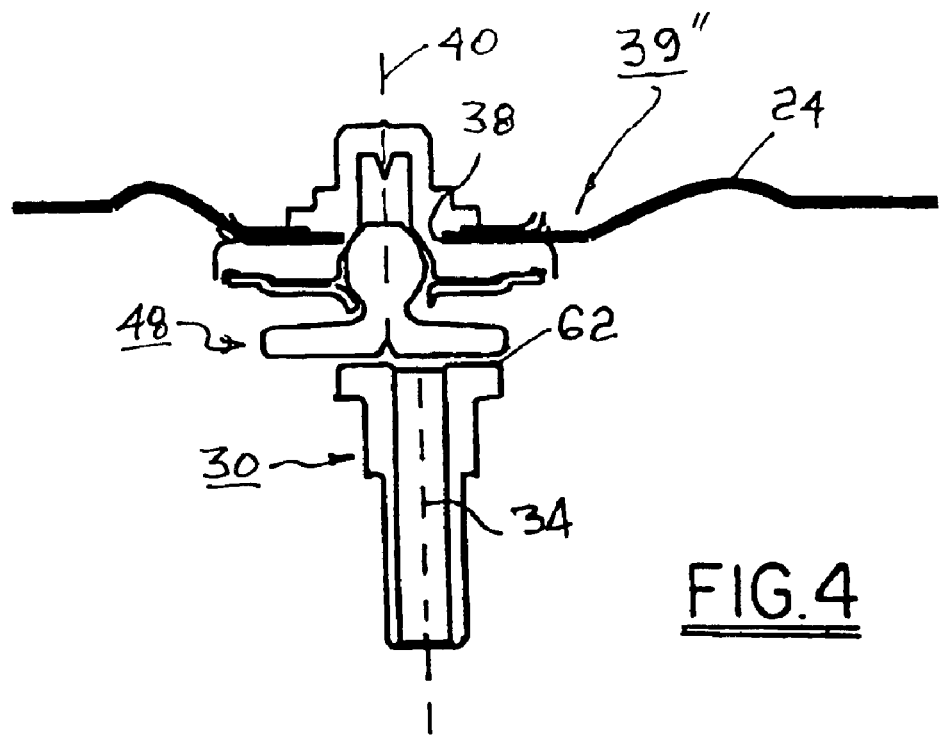
FIG. 4 is an elevational cross-sectional view of a portion of a fuel pressure regulator showing a second embodiment in accordance with the invention.
Figure 5:
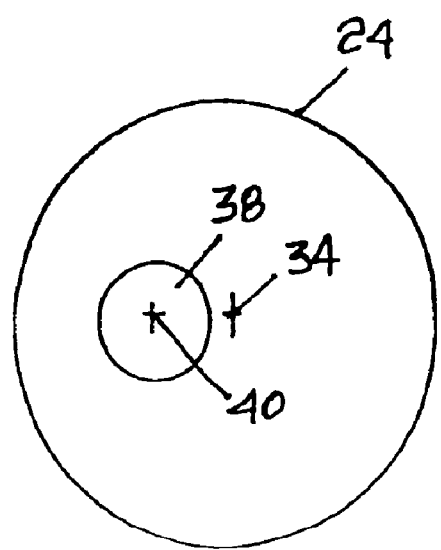
FIG. 5 is a plan view of the diaphragm shown in FIG. 4.

Referring to FIGS. 4 and 5, in a second embodiment of a regulating valve assembly 39", the valve head 48 and valve seat 30 may be axially offset in accordance with the invention by forming aperture 38 and axis 40 in diaphragm 24 off-center from seat and fuel orifice axis 34, thus displacing head 48 and head axis 40. Again, during operation, the head and seat are in continuous contact only at point 62.

Figure 6:
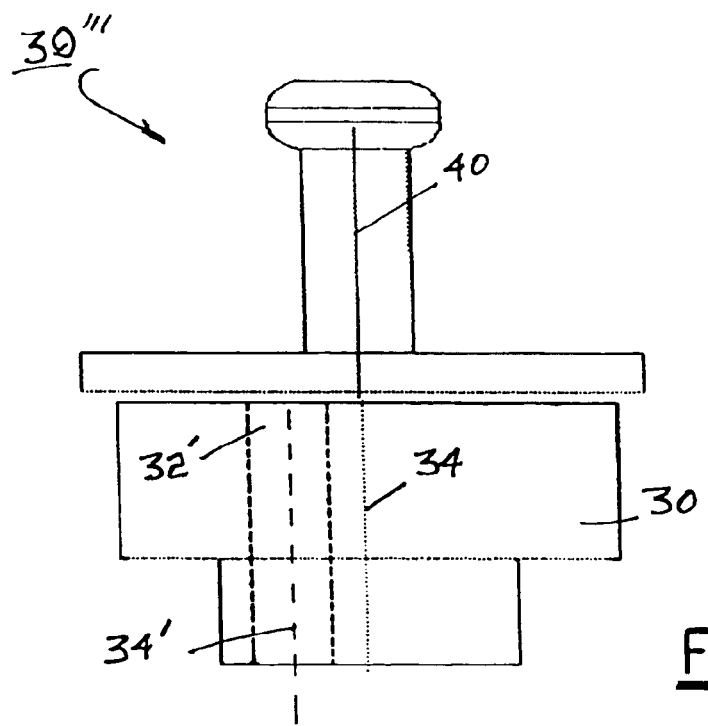
FIG. 6 is an elevational schematic view of a third embodiment of a regulating valve assembly in accordance with the invention.
Figure 7:
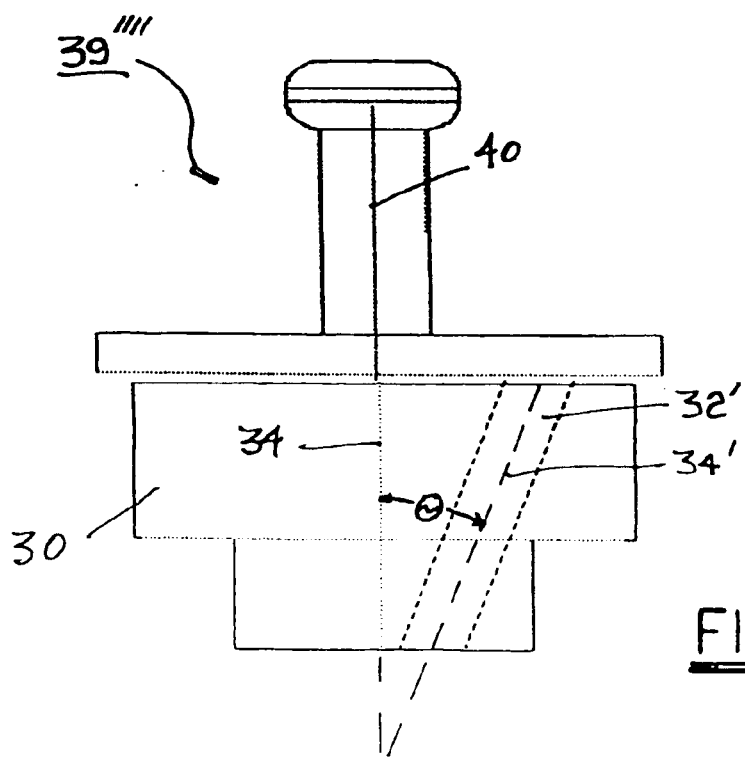
FIG. 7 is elevational schematic view of a fourth embodiment of a regulating valve assembly in accordance with the invention.

Referring to FIGS. 6 and 7, the axes may be offset in accordance with the invention by coaxially aligning head axis 40 and seat axis 34 as shown in prior art FIG. 1 but providing fuel orifice 32' off-center in seat 30 at a displaced orifice axis 34'. Axis 34' may be parallel with axis 40, as shown in third embodiment 39'" (FIG. 6), or inclined to axis 40 at an included angle θ, as shown in fourth embodiment 39"" (FIG. 7).

Figure 8:
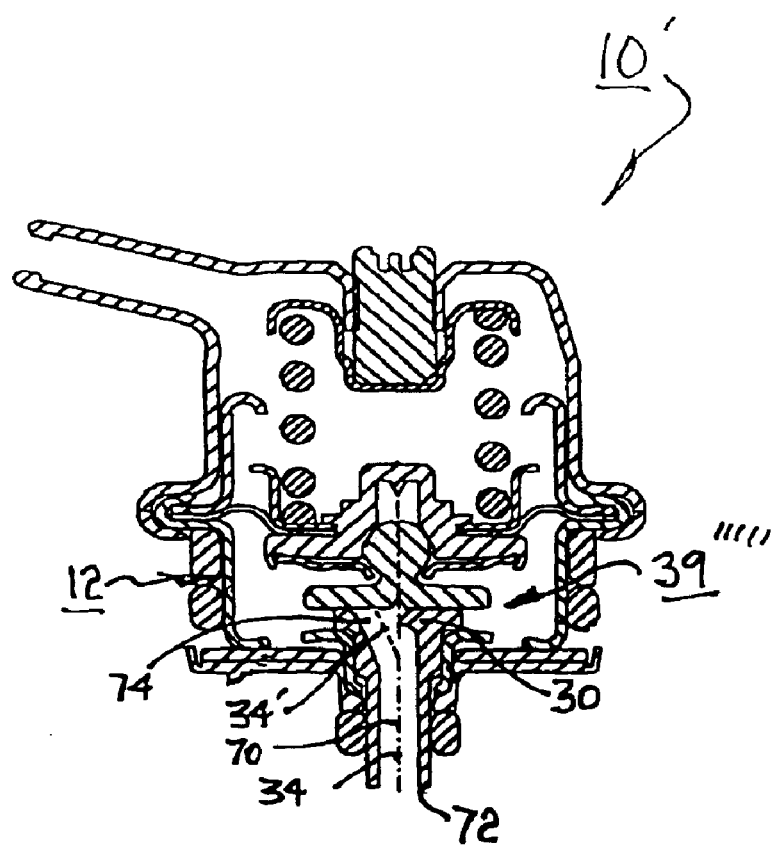
FIG. 8 is an elevational cross-sectional view of a fuel pressure regulator incorporating a fifth embodiment in accordance with the invention.

Referring to FIG. 8, an improved fuel pressure regulator 10' in accordance with the invention exemplarily incorporates fifth embodiment 39'"" of a regulating valve assembly. A blind axial bore 70 in seat 30 extending into seat 30 from end 72 along axis 34 is intersected by a second bore 74 extending from the opposite end of seat 30 along axis 34'.

Figure 9:
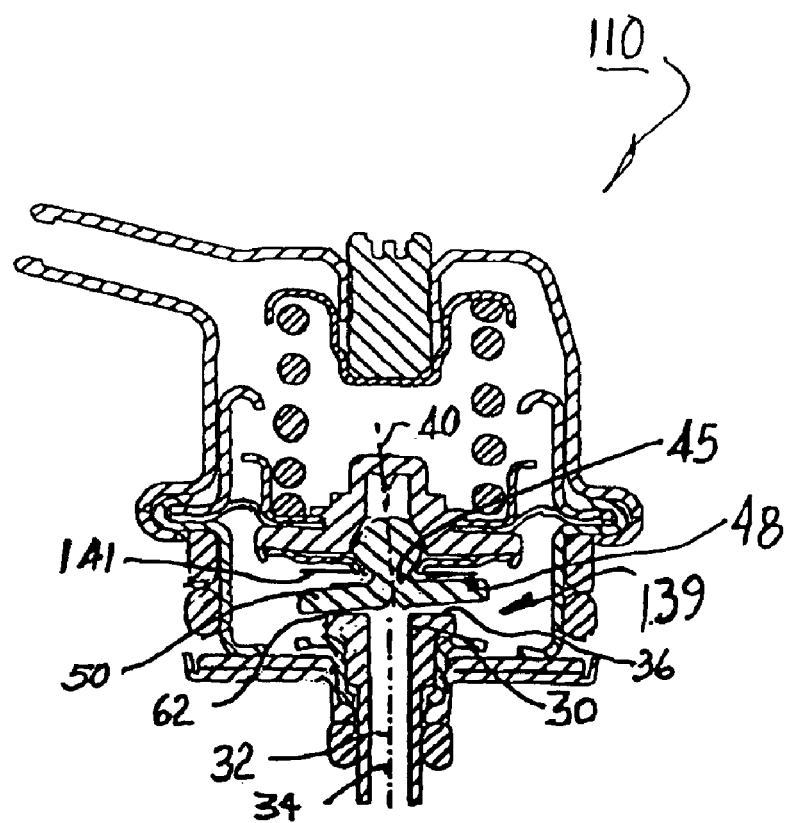
FIG. 9 is an elevational cross-sectional view of a fuel pressure regulator incorporating a sixth embodiment in accordance with the invention.
Figure 10:
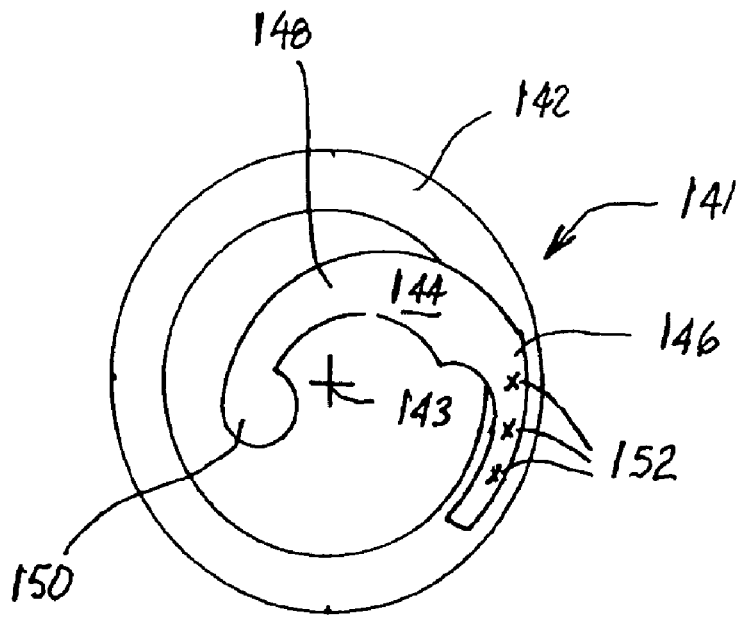
FIG. 10 is a plan view of the spring member shown in FIG. 9.
Figure 11:
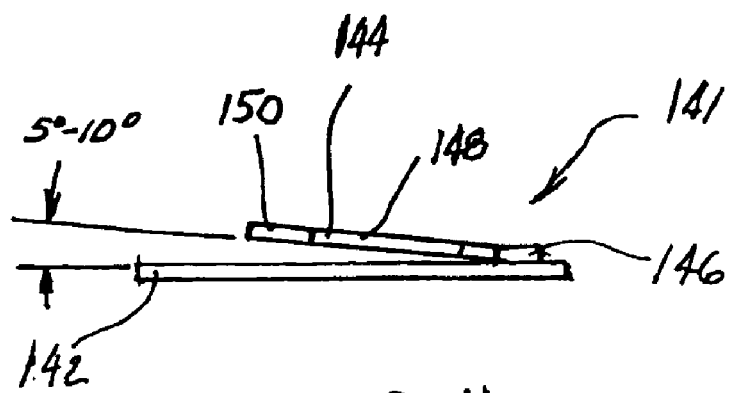
FIG. 11 is a side view if the spring member shown in FIG. 9.

Referring to FIGS. 9, 10 and 11, fuel pressure regulator 110 in accordance with the invention incorporates sixth embodiment 139 of a regulating valve assembly. In this embodiment, head flange 50, seat orifice 32, and seat 30 are formed as in the prior art. However, spring member 241 biasly tips head 48 relative to seat 30 so that, as can been seen in FIG. 9, as head 48 approaches sealing contact with axial seating surface 36, head 48 always makes first contact with point 62 on surface 36.

Spring member 141, includes outer hoop portion 142, which is generally circular in shape, and crescent portion 144. Crescent portion 144 includes base 146, arm 148 and end 150. As can be seen in FIG. 11, arm 148 and end 150 are preferably on the same plane while base 146 and hoop portion 142 relative to arm 148 and end 150 are off-plane by approximately, for example, in the range of preferably 5–10 degrees. Outer hoop portion 142 and crescent portion 144 are formed preferably from spring steel. Crescent portion 144 is positioned relative to hoop portion 142 so that, when assembled as shown in FIG. 9, and when center point 143 of outer hoop portion 142 coincides with seat axis 34, arm 148 and end 150 of crescent portion 144 loosely captures neck 45 of valve 48. In this position, crescent portion 144 is fixed to hoop portion 142 by, for example, spot welds 152.

As best shown in FIG. 9, with spring member 141 assembled as shown, head 48 always makes first contact with point 62 on surface 36. Thus, the valve has only one stable rest point on the seat and the motion of the head with respect to the seat is predictable and non-chaotic.

While biasing spring 141 shown in FIG. 9 is described as being formed from flat spring steel, it is contemplated that the biasing spring may be formed from a polymer material or from various other materials including spring wire.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. Apparatus for regulating inline pressure of a liquid flowing through the apparatus, the apparatus including a valve and comprising:
   a) a valve seat having a sealing surface with an edge and a flow orifice therethrough, said orifice having an orifice axis; and
   b) a valve head having a surface matable with said valve seat sealing surface and having a valve head axis,
   wherein said orifice axis and said valve head axis are non-coaxial, with a point on said sealing surface edge closest to said orifice axis of said valve seat establishing a single point of contact with said valve head surface.

2. A method for preventing chaotic flow in an apparatus for regulating inline pressure of a liquid flowing through the apparatus, the apparatus including a valve seat having a flow orifice trerethrough, said orifice having an orifice axis, and a valve head matable with said valve seat and having a valve head axis, comprising the steps of:
   a) forming a first mating surface on said valve head in a plane orthogonal to said valve head axis; and
   b) forming a second mating sealing surface having an edge on said valve seat adjacent said first mating surface,
   wherein said orifice axis and said valve head axis are non-coaxial so that a point on said sealing surface edge closest to said orifice axis of said valve seat establishes a single point of contact with said valve head surface.

* * * * *